United States Patent [19]
Jeong et al.

[11] Patent Number: 5,657,087
[45] Date of Patent: Aug. 12, 1997

[54] MOTION COMPENSATION ENCODING METHOD AND APPARATUS ADAPTIVE TO MOTION AMOUNT

[75] Inventors: Jechang Jeong, Seoul; Sungtae Kim, Kyungki-do, both of Rep. of Korea

[73] Assignee: Samsung Electronics Co., Ltd., Kyungki-Do, Rep. of Korea

[21] Appl. No.: 490,704

[22] Filed: Jun. 15, 1995

[30] Foreign Application Priority Data

Jun. 15, 1994 [KR] Rep. of Korea ............... 94-13488

[51] Int. Cl.$^6$ ................................................ H04N 7/36
[52] U.S. Cl. ................................. 348/416; 348/699
[58] Field of Search ............................ 348/402, 407, 348/409, 410, 411, 412, 413, 415, 416, 420, 699; 382/236, 238

[56] References Cited

U.S. PATENT DOCUMENTS

| 5,006,929 | 4/1991 | Barbero et al. | 348/420 |
|---|---|---|---|
| 5,280,530 | 1/1994 | Trew et al. | 348/407 |
| 5,473,379 | 12/1995 | Horne | 348/699 |

*Primary Examiner*—Amelia Au
*Attorney, Agent, or Firm*—Sughrue, Mion, Zinn, Macpeak & Seas

[57] ABSTRACT

A motion compensating encoding apparatus responsive to a motion amount adaptively generates motion-compensated pixel values for performing differential pulse code modulation of pixel values of image even when the amount of motion compensation required motion-compensated with respect to a reference image is beyond a predetermined motion amount. The motion compensation encoding apparatus includes a global motion estimator for generating a global motion vector representing a spatial position difference between the reference image according to first pixel values stored in a first memory and the current image according to second pixel values stored in a second memory, motion-compensating the reference image on the basis of the generated global motion vector and storing the pixel values of the motion-compensated reference image, a local motion estimator for generating a local motion vector according to comparison of the pixel values between a current video block, which is formed from the second pixel values and which has a size smaller than the current image and a search area formed by part of the pixel values stored in the global motion estimator, a motion compensator for receiving the local motion vector from the local motion estimator and generating motion-compensated pixel values by using the pixel values stored in the global motion estimator and the local motion vector, and a unit for generating a difference value between the respective pixel values of each image secondly output from the second memory and the corresponding motion-compensated pixel values output from the motion compensator. A non-intracoding method is also described.

18 Claims, 4 Drawing Sheets ns shown in FIG. 1, a conventional motion image encoder

MOTION COMPENSATION ENCODING METHOD AND APPARATUS ADAPTIVE TO MOTION AMOUNT

BACKGROUND OF THE INVENTION

1. Field of the Invention

The present invention relates to a motion compensation encoding method which is adaptive to an amount of motion and more particularly to a motion compensation encoding method for a differential pulse encoded video signal capable of adaptively performing a motion compensation encoding operation even when an amount of motion between images is beyond a predetermined amount of motion. A corresponding apparatus is also disclosed.

The instant application is based on Korean Patent Application No. 94-13488, which is incorporated herein by reference for all purposes.

2. Brief Discussion of Related Art

In a many systems, a video signal is usually encoded into digital data and then processed to improve the quality the picture. However, when the video signal is encoded into the digital data, an amount of data increases dramatically large. To solve such a problem, a conventional video encoding system utilizes a transformation encoding method, a differential pulse code modulation (DPCM) method, a vector quantization method and a variable length coding (VLC) method, thereby removing redundancy data included in a digital video signal to thus reduce the total amount of data.

As shown in FIG. 1, a conventional motion image encoder having a well-known structure processes one frame of a digital video signal constructed from M×N pixels. Pixel values of the reconstructed video blocks are stored in memory 10. The pixel values stored in memory 10 is applied to a motion estimator 18, a subtracter 31 and a ratio controller 20. Motion estimator 18 uses pixel values of a current image supplied from memory 10 and pixel values of a reference image stored in a frame memory 17, to estimate an amount of motion with respect to the respective video blocks of the current image, where motion estimation is performed on the basis of correlation between frames. Motion estimator 18 finds a reference video block having image information nearly identical to that of a current video block used for comparison in a search area which becomes a part of the reference image, and then generate a motion vector MV representing the spatial position difference between the current video block and the reference video block.

A motion compensator 19 reads pixel values of the reference video block which is designated by motion vector MV produced by motion estimator 18, from frame memory 17. The read pixel values are output to subtracter 31. Subtracter 31 subtracts a corresponding pixel value applied from motion compensator 19 from a pixel value supplied from memory 10 for a differential pulse code modulation and outputs a differential pixel value obtained by this subtraction to a transformer 11.

A transformer 11 transforms spatial region pixel values supplied from subtracter 31 into frequency region transform coefficient values. Transformer 11 uses one among a discrete cosine transform (DCT) method, a Walsh-Hadamard transform (WHT) method, a discrete Fourier transform (DFT) method or a discrete sine transform (DST) method, to perform a transform operation in units of a video block having M×N pixels. The transform coefficient values output from transformer 11 are then quantized by a quantizer 12 to then be supplied to a variable-length coder 13 and an inverse quantizer 15.

Quantizer 12 and inverse quantizer 15 quantizes and inverse-quantizes, respectively, the input data according to a quantization control signal Qss applied from ratio controller 20. Since technologies in connection with quantizer 12 and inverse quantizer 15 are well known, detailed descriptions thereof will be omitted.

Variable-length coder 13 variable-length-codes the input data. A buffer 14 temporarily stores the data output from variable-length coder 13 prior to being transmitted, and outputs a buffer fullness representing a storage state of buffer 14 to ratio controller 20. Ratio controller 20 generates a control signal Qss for quantization on the basis of the pixel values supplied from memory 10 and the buffer fullness applied from buffer 14.

On the other hand, an inverse transformer 16 performs an inverse transform of the transform coefficient values applied from inverse quantizer 15 with respect to the transform by transformer 11, to generate spatial region pixel values. An adder 32 adds pixel values applied from motion compensator 19 and pixel values applied from inverse transformer 16, to then outputs the result to frame memory 17. Frame memory 17 stores the pixel values applied from adder 32. The quantization control signal generated by ratio controller 20, the motion vector MV generated by motion estimator 18 and output data Vc of buffer 14 are all supplied to a video decoder shown in FIG. 2. Switches 33 and 34 are used for reducing differences between an image prior to being encoded by differential pulse code modulation in the motion picture encoder shown in FIG. 1 and an image after decoding in the decoder shown in FIG. 2.

In the motion decoder of FIG. 2, variable-length decoder 21 variable-length-decodes data Vc output from buffer 14. An inverse quantizer 22 and an inverse transformer 23 perform the same functions as those of inverse quantizer 15 and inverse transformer 23 of FIG. 1, respectively. Motion compensator 24 reads pixel values from frame memory 25 corresponding to motion vector MV to supply the read pixel values to an adder 26. Adder 26 adds the output data of motion compensator 24 to the output data of inverse transformer 23, to output the result to a display and frame memory 25. A switch 27 is used for the same purpose as those of above switches 33 and 34.

Since the motion image encoder shown in FIG. 1 uses a search area composed of the number of pixels smaller than one frame to find a reference video block having the substantially same image information as that of a current video block, a reference video block having the same image information as that of the current video block will not exist in a given search area, in case of a fast moving picture or a whole faning picture such as sports. The FIG. 1 motion image encoder does not perform a non-intracoding operation which obtains a difference value between image frames by using differential pulse code modulation with respect to the current video block, but performs an intracoding operation. Accordingly, an amount of bits of the encoded data becomes large. Such a problem lowers the total quality of picture and heightens the probability of occurrence of an overflow condition in buffer 14, in a system by a predetermined data standard which uses a proper combination of an intracoding and a non-intracoding.

SUMMARY OF THE INVENTION

Therefore, to solve the above problems, it is an object of the present invention to provide a motion compensation encoding method which estimates an amount of motion with respect to a video block to be motion-compensation-encoded and is adaptive to an amount of motion for generating the motion-compensated data, in which a global motion vector representing displacement between the frames is generated by altering a motion estimation range into a whole frame in case of an image having a motion estimation signifying a large amount of motion between frames, and using data of the frame motion-compensated by the generated global motion vector.

It is another object of the present invention to provide an apparatus embodying the aforementioned method.

It is still another object of the present invention to provide a motion compensation encoding apparatus which is adaptive to an amount of motion for generating motion-compensated data by generating a reference image which is obtained by compensating for spatial position difference between an image to be motion-compensated and an image which becomes a reference of motion compensation.

These and other objects, features and advantages according to the present invention are provided by a motion compensation encoding method for use in an image encoder for performing differential pulse code modulation by using pixel values of a current image and motion-compensated pixel values. The motion compensation encoding method includes steps for:

a) storing pixel values of a reference image for motion compensation;

b) storing pixel values of the current image;

c) discriminating whether an amount of motion of the current image to be motion-compensated is beyond a predetermined amount of motion on the basis of all the pixel values stored in steps a) and b);

d) generating a global motion vector representing a spatial position difference of the current image of the pixel values stored in step b) with respect to the reference image of the pixel values stored in step a), when a discrimination result of step c) represents that the current image motion amount is beyond the predetermined motion amount;

e) motion-compensating the reference image corresponding to the pixel values stored in step a) to store the pixel values of the motion-compensated reference image;

f) generating a second local motion vector on the basis of comparison of respective pixel values between a first video block and a second search area formed by part of the pixel values stored in step e);

g) generating motion-compensated pixel values by using the second local motion vector generated in step f) and the corresponding pixel values stored in step e); and h) generating a difference value between the respective pixel values of the current image stored in step b) and the corresponding pixel values of the motion-compensated reference image generated in step g).

These and other objects, features and advantages according the present invention are accomplished by providing a motion compensation encoding apparatus for use in an image encoder for performing differential pulse code modulation using pixel values of a current image and motion-compensated pixel values. The motion compensation encoding apparatus includes:

a first memory storing pixel values of a reference image;

a second memory storing pixel values with respect to a plurality of images, providing the stored pixel values of each image one-frame by one-frame, and again providing the pixel values of each image output one-frame by one-frame at least once more on the basis of a first control signal;

a motion discrimination device, coupled to receive the firstly output one-frame pixel values among the duplicate pixel values of the same image output from the second memory, acting as means for discriminating whether an amount of motion of the current image according to the pixel values supplied from the second memory with respect to the reference image according to the pixel values stored in the first memory, is beyond a predetermined amount of motion, and generating first and second control signals according to the discrimination result;

a global motion estimation device acting as means for generating a global motion vector representing spatial position difference between the reference image according to the pixel values stored in the first memory and the current image according to the pixel values stored in the second memory, and storing the pixel values of the motion-compensated reference image on the basis of the generated global motion vector;

a local motion estimation circuit acting as means for discriminating whether the motion-compensated reference image is stored in the global motion estimation means, and generating one of a first local motion vector according to comparison of the pixel values between a current video block which is formed by the pixel values supplied from the second memory, and which has a size smaller than the current image and a first search area formed by part of the pixel values stored in the first memory, and a second local motion vector according to comparison of the pixel values between the current video block and a second search area formed by part of the pixel values stored in the global motion estimation devices, on the basis of the discrimination result;

a switch acting as switching means for providing the pixel values supplied from the second memory to the local motion estimation circuit if the second control signal generated in the motion discrimination device represents that the current image motion amount is not beyond the predetermined motion amount, producing one-frame pixel values among the pixel values of the same image supplied from the second memory, if the second control signal represents that the current image motion amount is beyond the predetermined motion amount, and providing the following one-frame pixel values to the local motion estimation circuit;

a motion compensation device acting as means for generating motion-compensated pixel values by using the pixel values stored in the first memory and the first local motion vector if the first local motion vector is applied from the local motion estimation circuit, and generating motion-compensated pixel values stored in the global motion estimation means and the second local motion vector, if the second local motion vector is applied from the local motion estimation circuit; and circuitry acting as means for generating a difference value between the respective pixel values of each image output from the second memory and the corresponding motion-compensated pixel values output from the motion compensation device.

These and other objects, features and advantages according to the present invention can be accomplished by providing a motion compensation encoding apparatus for use in an image encoder for performing differential pulse code modulation by using pixel values of a current image and motion-compensated pixel values. Preferably, the motion compensation encoding apparatus includes:

a first memory for storing pixel values of a reference image;

a second memory for storing pixel values with respect to a plurality of images, and repetitively providing the stored pixel values of each image one-frame by one-frame at least twice;

a global motion estimation device acting as means for generating a global motion vector representing spatial position difference between the reference image according to the pixel values stored in the first memory and the current image according to the pixel values stored in the second memory, motion-compensating the reference image on the basis of the generated global motion vector and storing the pixel values of the motion-compensated reference image;

a local motion estimation circuit acting as means for generating a local motion vector according to comparison of the pixel values between a current video block which is formed by the pixel values supplied from the second memory, and which has a size smaller than the current image and a search area formed by part of the pixel values stored in the global motion estimation device;

a motion compensation device acting as means for receiving the local motion vector from the local motion estimation circuit and generating motion-compensated pixel values by using the pixel values stored in the global motion estimation device and the local motion vector; and a device acting as means for generating a difference value between the respective pixel values of each image secondly output from the second memory and the corresponding motion-compensated pixel values output from the motion compensation device.

BRIEF DESCRIPTION OF THE DRAWINGS

The preferred embodiments are described with reference to the drawings wherein.

DETAILED DESCRIPTION OF THE PREFERRED EMBODIMENT

Figure 1:
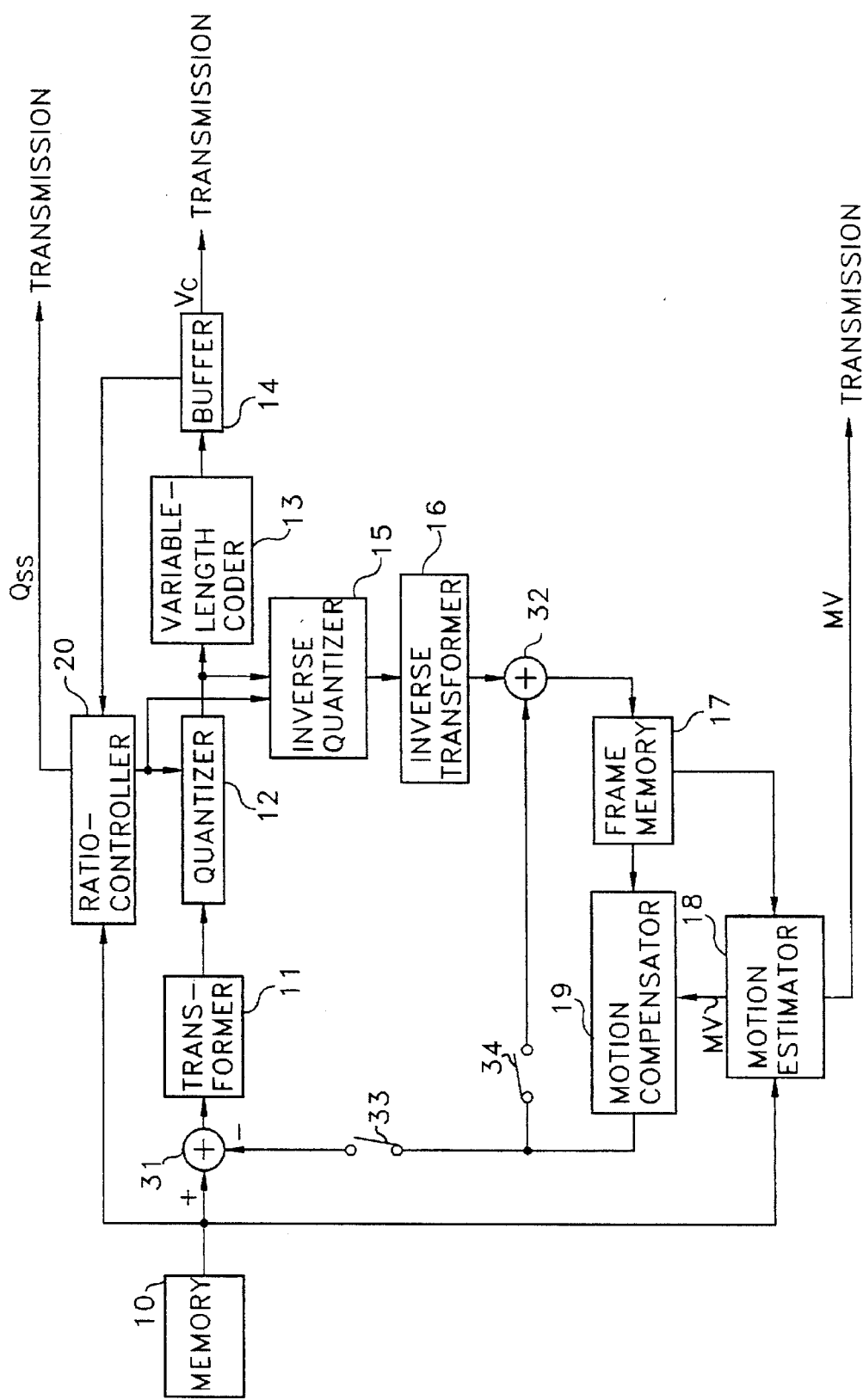
FIG. 1 is a block diagram showing a conventional image encoding system.
Figure 2:
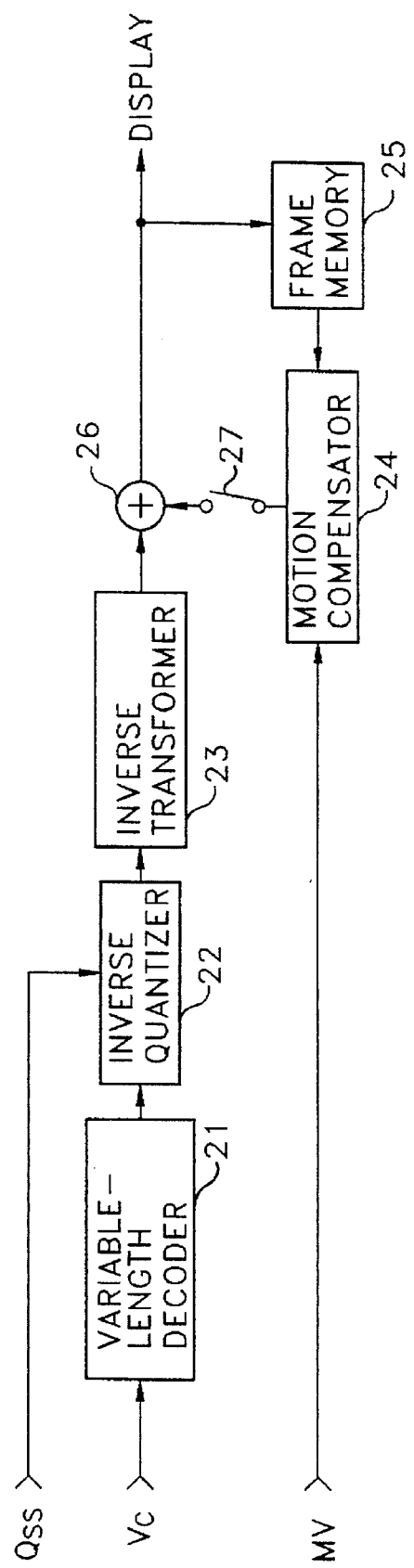
FIG. 2 is a block diagram showing a conventional image decoding system.
Figure 3:
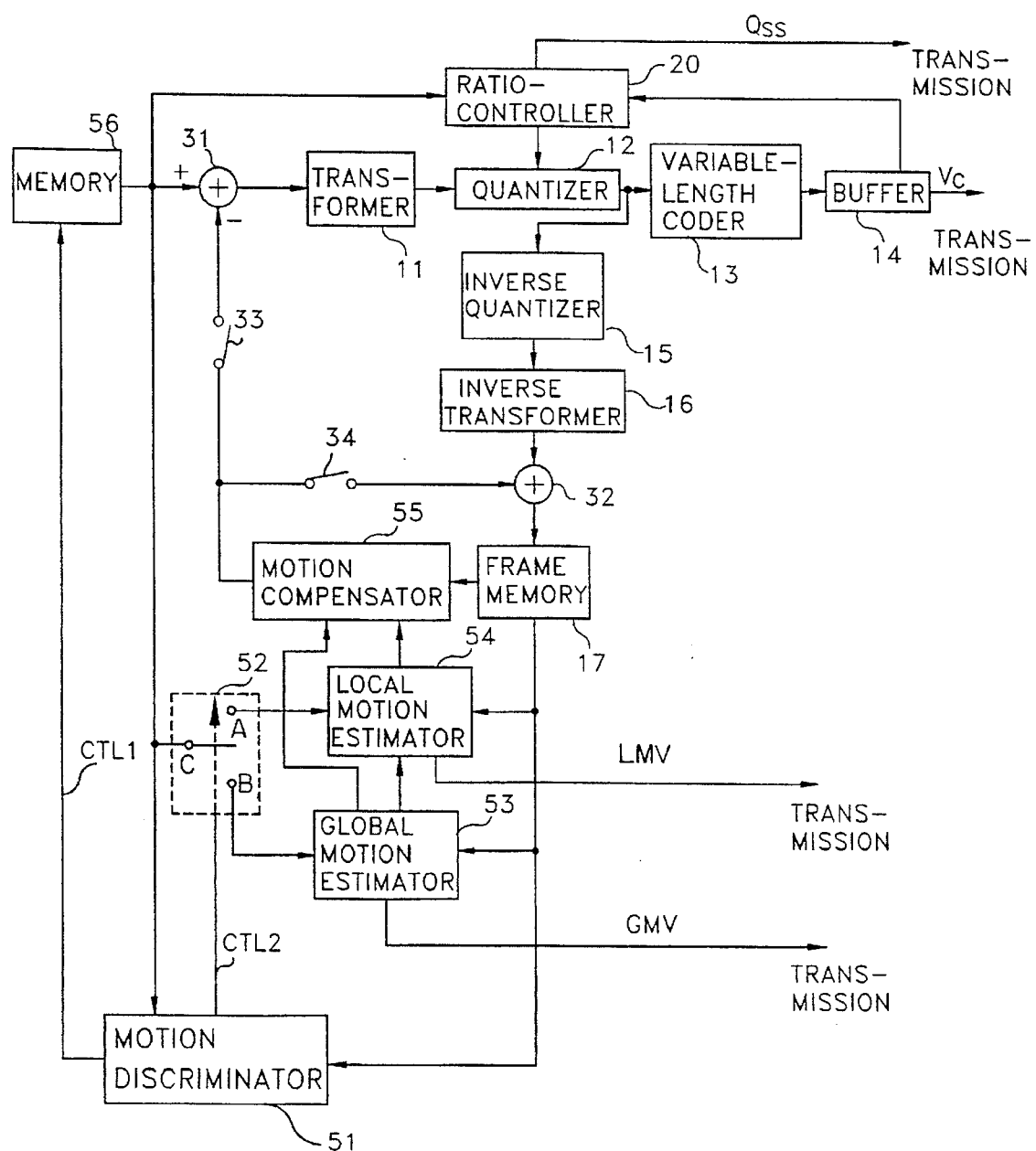
FIG. 3 is a block diagram showing a motion compensating encoding apparatus according to a preferred embodiment of the present invention.
Figure 4B:
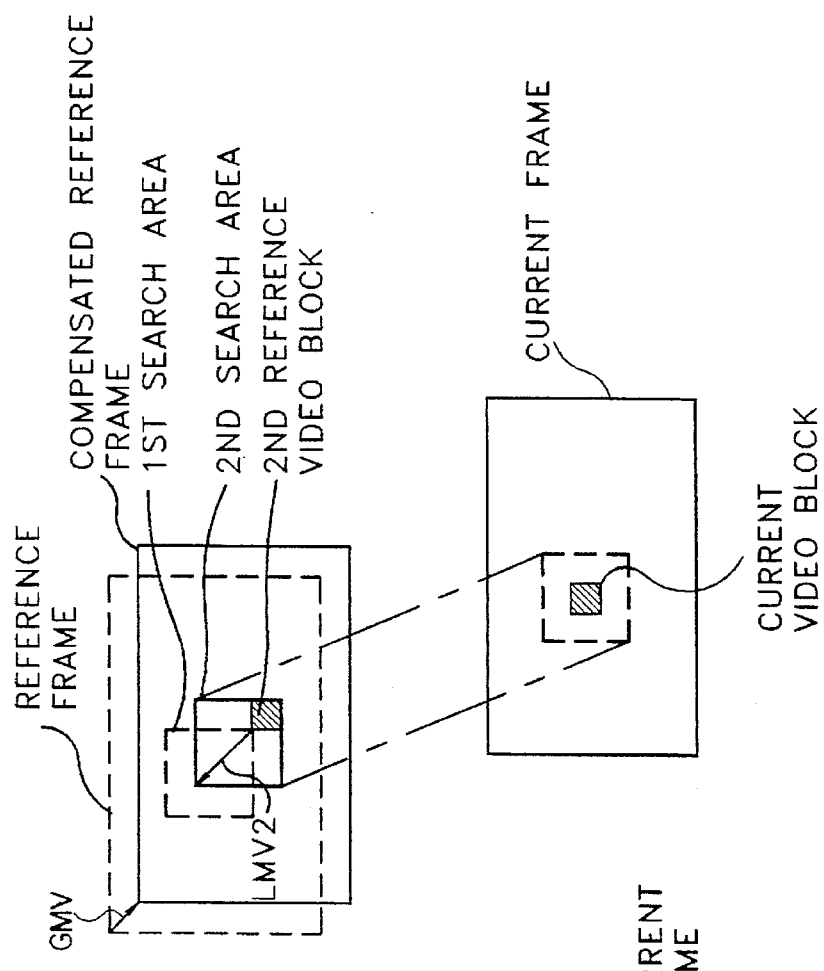
FIGS. 4A and 4B show a motion compensation encoding method which is adaptive to an amount of motion according to the present invention.

A preferred embodiment of the present invention will be described below in more detail with reference to the accompanying drawings FIGS. 3, 4A and 4B. FIG. 3 shows a motion compensation encoder according to a preferred embodiment of the present invention. It will be appreciated that like elements between FIG. 1 and FIG. 3 use like reference numerals; a detailed description a common elements will be omitted for the sake of brevity. Construction and operation of the FIG. 3 apparatus will be described below in connection with the present invention.

Memory 56 which stores pixel values for a plurality of images, outputs the pixel values of a previous image among the stored pixel values to a ratio controller 20 and a subtracter 31, and outputs the pixel values of a current image to motion discriminator 51. Subtracter 31 subtracts the corresponding pixel values supplied from motion compensator 55 from the respective pixel values of the previous image supplied from memory 31, and outputs a difference value to a transformer 11.

Motion discriminator 51 receives the pixel values of the reference image stored in a frame memory 17 when the pixel values of the current image are supplied from memory 56 and discriminates an amount of motion of the current image with respect to the reference image. To do so, motion discriminator 51 discriminates whether a first reference video block having the same image information as that of a current video block, which becomes a part of the current image exists in a first search area with respect to one or more current video blocks. Motion discriminator 51 generates a first control signal CTL1 representing whether motion estimation of the current image is possible using the pixel values of the reference image on the basis of the detection result. Motion discriminator 51 also generates a second control signal CTL2 on the basis of the above discrimination result. If first control signal CTL1 indicates that the motion estimation of the current image is possible using the pixel values of the reference image, memory 56 supplies the pixel values of the current image to a switch 52. Memory 56 supplies the pixel values of the current image again to a subtracter 31 after all the pixel values of the current image are supplied to switch 52.

Switch 52 supplies the pixel values of the current image supplied via an input end C from memory 56 to a local motion estimator 54 via a first output end A, according to the applied second control signal CTL2. Local motion estimator 54 discriminates whether the pixel values of the compensated reference image are stored in global motion estimator 53. If the pixel values of the compensated reference image are not stored in global motion estimator 53 as a discrimination result, local motion estimator 54 uses the pixel values of the reference image stored in frame memory 17 and the pixel values of the current image applied via switch 52, and generates a first local motion vector LMV1 with respect to a current video block.

Figure 4A:
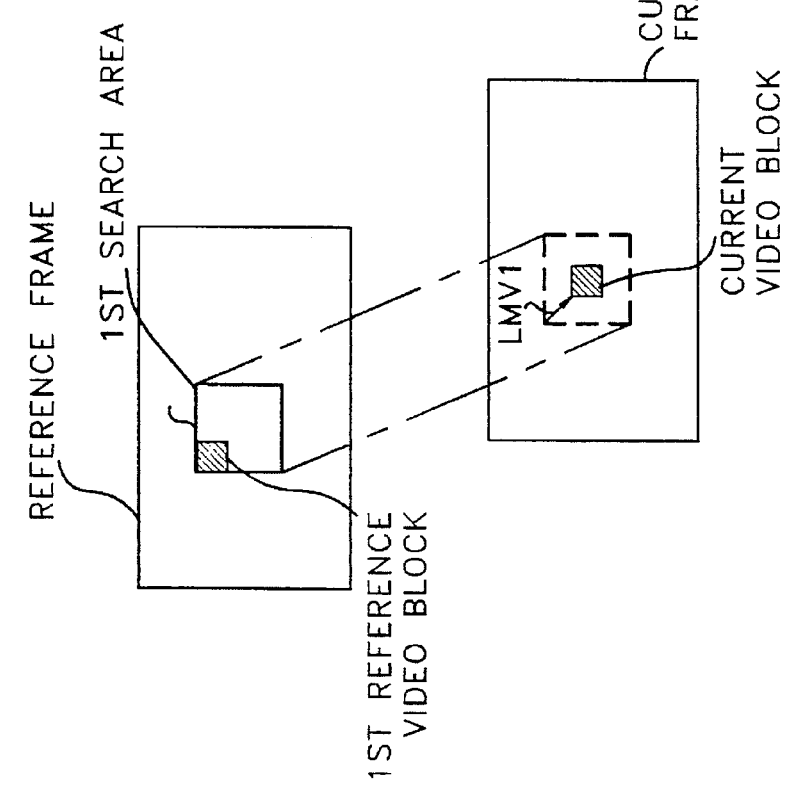

As shown in FIG. 4A, first local motion vector LMV1 is determined on the basis of the current video block within the current image and the first search area within the reference image. Here, the first search area has a smaller number of pixels than that of the reference image, and has a position on an image corresponding to the current video block. In FIG. 4A, the current video block is represented as a hatched rectangular shape, and the first reference video block having the same image information as that of the current video block is represented as a hatched rectangular shape. Local motion estimator 54 compares a corresponding block having the same number of pixels as that of the current video block and which is located on the left-upper end in the first search area and all blocks which are obtained by moving the corresponding block one-pixel by one-pixel to the right direction and/or to the down direction with the current video block. A method used for comparison is a well known mean absolute error (MAE) method or mean square error (MSE) method. If the first reference video block having the least difference value from the current video block is determined by comparison of the pixel values generated using MAE or MSE, local motion estimator 54 generates a first local motion vector LMV1 representing a spatial position difference between the first reference video block and the current video block. First local motion vector LMV1 is produced with respect to the respective current video blocks and the produced first motion vector LMV1 is supplied to motion compensator 55.

Motion compensator 55 discriminates that the pixel values of the compensated reference image are not stored in global motion estimator 53, when first motion vector LMV1 is applied from motion estimator 54. Based on such discrimination, motion compensator 55 generates the motion-compensated pixel values according to the pixel values of the reference image stored in frame memory 17 and first local motion vector LMV1 generated in motion estimator 54. Subtracter 31 subtracts the corresponding pixel values supplied from motion compensator 55 from the respective pixel values of the current image supplied from memory 56 and outputs the difference value obtained by subtraction to transformer 11. The pixel values output from motion compensator 55 are also supplied to an adder 32, by which is added to the data output from inverse transformer 16. The pixel values obtained by adder 32 are stored in frame memory 17 and used as the pixel values of the reference image for motion-compensating the following image.

If first control signal CTL1 generated in motion discriminator 51 indicates that motion estimation of the current image is not possible using the pixel values of the reference image, memory 56 repetitively supplies the pixel values of the current image frame by frame twice to switch 52. After memory 56 repetitively supplies the pixel values of the current image twice to switch 52, the pixel values of the current image are also supplied to subtracter 31. Switch 52 supplies the pixel values of firstly input one-frame current image among the pixel values of the two-frame current image supplied via input end C from memory 56 according to the applied second control signal CTL2, via a second output end to global motion estimator 53. Then, switch 52 supplies the pixel values of the secondly applied current image via output end A to local motion estimator 54. Local motion estimator 54 does not generate a local motion vector during the time when the pixel values of the current image are not supplied via switch 52. Subtracter 31 does not operate as well since the pixel values of the current image from memory 56 and the motion-compensated pixel values from motion compensator 55 are not supplied thereto.

Global motion estimator 53 generates a global motion vector GMV representing spatial position difference of the current image with respect to the reference image by using all the pixel values of the current image applied from second output end B of switch 52 and all the pixel values of the reference image stored in frame memory 17. Global motion estimator 53 uses one among the following equation (1) according to the MAE method or equation (2) according to the MSE method, to generate global motion vector GMV. The relationship between the reference image and the compensated reference image is conceptually shown in FIG. 4B. As can be seen from FIG. 4B, global motion vector GMV represents the spatial position difference of the current image with respect to the reference image.

$$MV(k, l) = \min \sum_{m=0}^{W} \sum_{n=0}^{H} |Y_{cur}(m+k, n+l) - Y_{ref}(m, n)| \quad (1)$$

$$-x\_rang \leq k \leq x\_rang - 1$$

$$-y\_rang \leq l \leq y\_rang - 1$$

$$MV(k, l) = \min \sum_{m=0}^{W} \sum_{n=0}^{H} |Y_{cur}(m+k, n+l) - Y_{ref}(m, n)|^2 \quad (2)$$

$$-x\_rang \leq k \leq x\_rang - 1$$

$$-y\_rang \leq l \leq y\_rang - 1$$

Here, $Y_{cur}(m, n)$ represents the $(m, n)^{th}$ pixel value in the current image, and $Y_{ref}(m, n)$ represents the $(m, n)^{th}$ pixel value in the reference image. Characters W and H represent the number of horizontal and vertical pixels, respectively. Expression x_rang and y_rang represent a movement range of the current image with respect to the reference image in the horizontal and vertical directions, respectively. That is, the current image can have a position with respect to the reference image within the range from x_rang to x_rang-1 of the reference image in the horizontal direction. This is also same as that in the vertical direction. As shown in FIG. 4B, global motion estimator 53 receives and stores the pixel values of the compensated reference image having a reference position moved from frame memory 17, by moving a position of the reference image by global motion vector GMV. Actually, in case of pixels to be added to a newly compensated reference frame by movement of the reference frame among the pixel values of the compensated reference frame stored in global motion estimator 53, all pixel values are established into any one of the same values. Such a value can be set to a specific value of "0" or "255" in case of a pixel value representing 256 gradations.

After global motion vector GMV and the compensated reference image have been completely determined by global motion estimator 53, the pixel values of the current image supplied from memory 56 are supplied via switch 52 to local motion estimator 54. Local motion estimator 54 determines whether the pixel values of the compensated reference image are stored in global motion estimator 53, when the pixel values of the current image are applied via first output end A of switch 52. If global motion estimator 53 stores the pixel values of the compensated reference image according to the discrimination result, local motion estimator 54 uses the pixel values of the compensated reference image stored in global motion estimator 53 and the pixel values of the current image applied via switch 52, to generate a second local motion vector LMV2 with respect to the current video block. Since a generation process of second local motion vector LMV2 in local motion estimator 54 is similar to that of motion estimator 18 which determines the first reference video block with respect to the current video block by using the pixel values stored in frame memory 17, the generation process thereof will be omitted.

Local motion estimator 54 compares the pixel values of the current video block with the pixel values in a second search area of the compensated reference frame, and determines a second reference video block in the second search area having the same image information as that of the current video block. Here, the second search area has a position which is moved by a value of global motion vector GMV from the first search area as shown in FIG. 4B, and has a position corresponding to the current video block used for comparison within the compensated reference image as well. Local motion estimator 54 generates second local motion vector LMV2 representing spatial position difference between the current video block and the second reference video block, if the second reference video block is determined. The generated second local motion vector LMV2 is supplied to motion compensator 55.

Motion compensator 55 uses the pixel values of the compensated reference image stored in global motion estimator 53 and the second local motion vector LMV2 to obtain the motion-compensated pixel values with respect to the current video block if the second local motion vector LMV2 is applied thereto, and then outputs the obtained pixel values to subtracter 31 and adder 32. Subtracter 31 subtracts the motion-compensated pixel values supplied from motion compensator 55 from the pixel values of the current image supplied from memory 56. Thereafter, since operation of the FIG. 3 apparatus is the same as the motion compensation operation using the first local motion vector LMV1, the detailed description thereof will be omitted. The global motion vector GMV and local motion vector LMV1 or LMV2 generated in the FIG. 3 apparatus are transmitted a decoder (not shown) for use in decoding the motion-compensated encoded image.

In case of the above-described embodiment, the apparatus of FIG. 3 operates on the basis of the control signals according to the discrimination of motion discriminator 51. It is, however, possible to provide other variations which are obtained by removing motion discriminator 51 and switch 52. The modified embodiment will be briefly described below referring to FIG. 3.

Where memory 56 outputs the pixel values of the current image, global motion estimator 53 generates a global motion vector of the current image with respect to the reference image in the same manner as that described referring to FIG. 3. Global motion estimator 53 uses the generated global motion vector, motion-compensates the reference image, and stores the pixel values of the motion-compensated reference image.

Local motion estimator 54 generates a local motion vector on the basis of the motion-compensated reference image stored in global motion estimator 53 and the pixel values of the current image applied from memory 56. Motion compensator 55 uses the local motion vector and the pixel values stored in global motion estimator 53, to generate the motion-compensated pixel values. Thus, motion compensator 55 can generate the motion-compensated pixel values properly as well when an amount of motion of the current image with respect to the reference image is beyond a predetermined motion amount.

As described above, the motion compensation encoder adaptive to an amount of motion according to the present invention can determine a motion vector with respect to the respective video blocks in the current image, even when motion vectors with respect to the respective video blocks in the current image cannot be used in determining using the search area determined in the reference image. Thus, a problem of increasing an amount of the transmission data occurring in the conventional motion compensation encoding system, which strictly performs an intracoding operation because of no determination of the motion vector is made with respect to an image having a large amount of motion, can be solved.

While only certain embodiments of the invention have been specifically described herein, it will apparent that numerous modifications may be made thereto without departing from the spirit and scope of the invention.

What is claimed is:

1. A motion compensation encoding apparatus for use in an image encoder for performing differential pulse code modulation by using pixel values of a current image and motion-compensated pixel values, said motion compensation encoder comprising:

a first memory for storing first pixel values of a reference image;

a second memory for storing second pixel values with respect to a plurality of images, and repetitively outputting the stored pixel values of each image one-frame by one-frame at least twice;

a global motion estimator for generating a global motion vector representing a spatial position difference between the reference image according to the first pixel values stored in the first memory and the current image according to the second pixel values stored in the second memory, motion-compensating the reference image on the basis of the generated global motion vector and storing respective global pixel values of the motion-compensated reference image;

a local motion estimator for generating a local motion vector according to comparison of respective pixel values between a current video block which is formed by the second pixel values supplied from the second memory, and which has a size smaller than the current image, and a search area formed by part of the global pixel values stored in the global motion estimator;

a motion compensator for receiving the local motion vector from the local motion estimator and generating motion-compensated pixel values by using the global pixel values stored in the global motion estimator and the local motion vector; and a difference generator for generating a difference value between the respective pixel values of each image secondly output from the second memory and the corresponding motion-compensated pixel values output from the motion compensator.

2. The motion compensation encoding apparatus according to claim 1, wherein said global motion estimator generates said global motion vector on the basis of a mean absolute error value according to pixel difference values between a plurality of respectively moved current images obtained by movement within a motion estimation range and the reference image.

3. The motion compensation encoding apparatus according to claim 1, wherein said global motion estimator generates said global motion vector on the basis of a mean square error value according to pixel difference values between a plurality of respectively moved current images obtained by movement within a motion estimation range and the reference image.

4. A motion compensation encoding apparatus for use in an image encoder for performing differential pulse code modulation by using pixel values of a current image and motion-compensated pixel values, said motion compensation encoding apparatus comprising:

a first memory for storing first pixel values of a reference image;

a second memory for storing second pixel values with respect to a plurality of images, providing the stored second pixel values of each image one-frame by one-frame, and again providing the stored second pixel values of each image output frame-by-frame at least once more on the basis of a first control signal;

motion discrimination means, coupled to receive the first output one-frame pixel values among duplicate second pixel values of the same image output from the second memory, for discriminating whether an amount of motion of the current image according to the second pixel values with respect to the reference image according to the first pixel values, is beyond a predetermined amount of motion, and generating first and second control signals according to discrimination result;

global motion estimation means for generating a global motion vector representing a spatial position difference between the reference image according to the first pixel values and the current image according to the second pixel values, and storing global pixel values of the motion-compensated reference image on the basis of the generated global motion vector;

local motion estimation means for discriminating whether the motion-compensated reference image is stored in the global motion estimation means, and generating one of a first local motion vector according to comparison of respective pixel values between a current video block, which is formed by the second pixel values, and which has a size smaller than the current image, and a first search area formed by part of the first pixel values stored in the first memory, and a second local motion vector according to comparison of the respective pixel values between the current video block and a second search area formed by part of the global pixel values stored in global motion estimation means, on the basis of the discrimination result;

switching means for providing the second pixel values to the local motion estimation means when second control signal generated in the motion discrimination means indicates that the current image motion mount is not beyond the predetermined motion mount, providing one-frame pixel values among the second pixel values of the same image supplied from the second memory to the global motion estimation means, when the second control signal represents that the current image motion amount is beyond the predetermined motion amount, and outputting respective following one-frame pixel values to the local motion discrimination means;

motion compensation means for generating motion-compensated pixel values using the first pixel values stored in the first memory and the first local motion vector when the first local motion vector is applied from the local motion estimation means, and for generating motion-compensated pixel values stored in the global motion estimation means and the second local motion vector, when the second local motion vector is applied from the local motion estimation means; and means for generating a difference value between the respective pixel values of each image output from the second memory and the corresponding motion-compensated pixel values output from the motion compensation means.

5. The motion compensation encoding apparatus according to claim 4, wherein said second memory outputs the pixel values of the current image frame-by-frame twice when the first control signal indicates that the current image motion amount is beyond a predetermined motion amount, while said second memory outputs the second pixel values of the current image of only one frame when the first control signal indicates that the former is not beyond the latter.

6. The motion compensation encoding apparatus according to claim 4, wherein said motion discrimination means generates the first control signal according to a result of whether a first reference video block having the same image information as that of the current video block exists in the first search area corresponding to the current video block.

7. The motion compensation encoding apparatus according to claim 6, wherein said motion discrimination means discriminates whether the first reference video block having the same image information with respect to a plurality of the current video blocks exists in the current image.

8. The motion compensation encoding apparatus according to claim 4, wherein said local motion estimation means generates said first local motion vector on the basis of a mean absolute error value according to pixel difference values between a plurality of respectively moved current images obtained by movement within a motion estimation range and the reference image.

9. The motion compensation encoding apparatus according to claim 4, wherein said local motion estimation means generates said first local motion vector on the basis of a mean square error value according to pixel difference values between a plurality of respectively moved current images obtained by movement within a motion estimation range and the reference image.

10. The motion compensation encoding apparatus according to claim 4, wherein said local motion estimation means generates said first local motion vector when the motion-compensated reference image is not stored in said global motion estimation means while said local motion estimation means generates said second local motion vector when the motion-compensated reference image is stored in said global motion estimation means.

11. A motion compensation encoding method for use in an image encoder for performing differential pulse code modulation by using pixel values of a current image and motion-compensated pixel values, said motion compensation encoding method comprising the steps of:

a) storing reference pixel values of a reference image for motion compensation;

b) storing current pixel values of the current image;

c) discriminating whether an amount of motion of the current image to be motion-compensated is beyond a predetermined amount of motion on the basis of all the respective pixel values stored in steps a) and b);

d) generating a global motion vector representing a spatial position difference of the current image of the pixel values stored in step b) with respect to the reference image of the reference pixel values stored in step a), when a discrimination result of step c) represents that the current image motion amount is beyond the predetermined motion amount;

e) motion-compensating the reference image corresponding to the reference pixel values stored in step a) to store the respective first-motion compensated pixel values of the motion-compensated reference image;

f) generating a first local motion vector on the basis of comparison of respective pixel values between a first video block and a second search area formed by part of the first motion-compensated pixel values stored in step e);

g) generating respective first motion-compensated pixel values by using the second local motion vector generated in step f) and the corresponding pixel values stored in step e); and h) generating a difference value between the respective current pixel values of the current image stored in step b) and the corresponding pixel values of the motion-compensated reference image generated in step g).

12. The motion compensation encoding method according to claim 11, further comprising the steps of:

i) generating a second local motion vector on the basis of comparison of the pixel values between the first video block which is formed by the current pixel values stored in step b) and having a smaller size than that of the current image and a first search area formed by a part of the reference pixel values stored in step a);

j) generating respective motion-compensated pixel values using the second local motion vector generated in step i) and the corresponding reference pixel values stored in step a); and k) generating a difference value between the respective current pixel values of the current image stored in step b) and the corresponding pixel values of the motion-compensated reference image generated in step j), wherein the discrimination result of step c) indicates that the current image motion amount is not beyond the predetermined motion amount.

13. The motion compensation encoding method according to claim 11, wherein said step c) comprises the sub-steps of:

c1) forming the first search area for motion estimation of the current video block, and including the current video block having a part of the current image pixel values and a part of the reference pixel values stored in step a);

c2) discriminating whether the reference video block having the same image information as that of the current video block exists in the first search area on the basis of comparison of the image information between the current video block pixel values formed in sub-step c1) and the corresponding blocks which exist in the first search area and having the same number of pixels as that of the current video block; and c3) discriminating whether the current image motion amount is beyond the predetermined motion amount on the basis of the respective discrimination result of sub-step c2).

14. The motion compensation encoding method according to claim 13, wherein said sub-step c2) further comprises the sub-step c2a) of discriminating whether the first reference video block having the same image information with respect to a plurality of the current video blocks exists in the current image.

15. The motion compensation encoding method according to claim 11, wherein said step d) further comprises the sub-step of d1) generating the global motion vector on the basis of a mean absolute error value according to pixel difference values between a plurality of respectively moved current image obtained by movement of the current image within a predetermined motion estimation range and the reference image.

16. The motion compensation encoding method according to claim 15, wherein said sub-step d1) comprises the sub-step of d1a) calculating the mean absolute error value of the pixel difference values between one current image by movement using the following equation and the reference image, $$MV(k, l) = \min \sum_{m=0}^{W} \sum_{n=0}^{H} |Y_{cur}(m+k, n+l) - Y_{ref}(m, n)|$$

$$-x\_rang \leq k \leq x\_rang - 1$$

$$-y\_rang \leq l \leq y\_rang - 1$$

wherein $Y_{cur}(m, n)$ represents the $(m, n)^{th}$ pixel value in the current image, and $Y_{ref}(m, n)$ represents the $(m, n)^{th}$ pixel value in the reference image, characters W and H represent respective numbers of horizontal and vertical pixels, and expression x_rang and y_rang represent a movement range of the current image with respect to the reference image in the horizontal and vertical directions, respectively.

17. The motion compensation encoding method according to claim 11, wherein said step d) further comprises the sub-step d2) of generating the global motion vector on the basis of a mean square error value according to pixel difference values between a plurality of respectively moved current image obtained by movement of the current image within a predetermined motion estimation range and the reference image.

18. The motion compensation encoding method according to claim 17, wherein said sub-step d2) comprises the sub-step da2) of calculating the mean square error value of the pixel difference values between one current image by movement using the following equation and the reference image, $$MV(k, l) = \min \sum_{m=0}^{W} \sum_{n=0}^{H} |Y_{cur}(m+k, n+l) - Y_{ref}(m, n)|^2$$

$$-x\_rang \leq k \leq x\_rang - 1$$

$$-y\_rang \leq l \leq y\_rang - 1$$

wherein $Y_{cur}(m, n)$ represents the $(m, n)^{th}$ pixel value in the current image, and $Y_{ref}(m, n)$ represents the $(m, n)_{th}$ pixel value in the reference image, characters W and H represent respective numbers of horizontal and vertical pixels, and expressions x_rang and y_rang represent a movement range of the current image with respect to the reference image in the horizontal and vertical directions, respectively.

* * * * *